(12) United States Patent
Koch et al.

(10) Patent No.: US 6,423,392 B1
(45) Date of Patent: Jul. 23, 2002

(54) LABEL ADHESIVES AND CONSTRUCTIONS EXHIBITING LOW ADHESIVE RESIDUE IN PRINTERS

(75) Inventors: Carol A. Koch, San Gabriel; Alfred J. Chompff, Huntington Beach; Hsiao Ken Chuang, Arcadia, all of CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/464,369

(22) Filed: Dec. 15, 1999

Related U.S. Application Data

(60) Provisional application No. 60/112,524, filed on Dec. 15, 1998.

(51) Int. Cl.⁷ ............. B32B 9/00; B32B 33/00; B32B 31/18; B41M 1/26
(52) U.S. Cl. .......... 428/42.3; 428/42.2; 428/409; 428/411.1; 101/483; 101/DIG. 30; 156/250
(58) Field of Search .............. 428/409, 42.3, 428/411.1, 42.2; 156/250; 101/DIG. 30, 483

(56) References Cited

U.S. PATENT DOCUMENTS

| | | | |
|---|---|---|---|
| 3,096,202 A | 7/1963 | deGroot von Arx | 117/68.5 |
| 3,464,842 A | 9/1969 | Jackstadt | 117/44 |
| 4,112,177 A | 9/1978 | Salditt et al. | 428/304 |
| 4,151,319 A | 4/1979 | Sackoff et al. | 428/40 |
| 4,199,645 A | 4/1980 | Schwarz | 428/339 |
| 4,260,659 A | 4/1981 | Gobran | 428/217 |
| 4,262,058 A | 4/1981 | Saunders | 428/537 |
| 4,335,171 A | 6/1982 | Zenk | 428/40 |
| 4,374,883 A | 2/1983 | Winslow | 428/40 |
| 4,543,139 A | 9/1985 | Freedman et al. | 156/152 |
| 4,581,281 A | 4/1986 | Gerace | 428/215 |
| 4,619,851 A | 10/1986 | Sasaki et al. | 428/40 |
| 4,894,259 A | 1/1990 | Kuller | 427/208.8 |
| 4,935,288 A | 6/1990 | Honaker et al. | 428/207 |
| 4,992,501 A | 2/1991 | Hanninen et al. | 524/272 |
| 5,154,956 A | 10/1992 | Fradrich | 428/40 |
| 5,189,126 A | 2/1993 | Bernard | 526/261 |
| 5,196,504 A | 3/1993 | Scholz et al. | 526/318.4 |
| 5,221,706 A | 6/1993 | Lee et al. | 524/156 |
| 5,264,532 A | 11/1993 | Bernard | 526/261 |
| 5,326,644 A | 7/1994 | Scholz et al. | 428/514 |
| 5,380,779 A | 1/1995 | D'Haese | 524/272 |
| 5,470,563 A | 11/1995 | Tanaka et al. | 424/448 |
| 5,492,950 A | 2/1996 | Brown et al. | 524/166 |
| 5,558,913 A | 9/1996 | Sasaki et al. | 428/41.5 |
| 5,593,759 A | 1/1997 | Vargas et al. | 428/200 |
| 5,623,011 A | 4/1997 | Bernard | 524/270 |
| 5,648,167 A | 7/1997 | Peck | 428/355 AC |
| 5,700,535 A | 12/1997 | Galsterer et al. | 428/40.1 |
| 5,718,958 A | 2/1998 | Scholz et al. | 428/40.1 |
| 5,728,430 A | 3/1998 | Sartor et al. | 427/356 |
| 5,738,939 A | 4/1998 | Calhoun et al. | 428/343 |
| 5,827,609 A | 10/1998 | Ercillo et al. | 428/354 |
| 6,218,006 B1 * | 4/2001 | Tokunaga et al. | 428/355 AC |

FOREIGN PATENT DOCUMENTS

| | | |
|---|---|---|
| JP | 56053166 | 5/1981 |
| JP | 6001958 | 1/1994 |
| JP | 7003218 | 1/1995 |
| WO | 88/03477 | 5/1988 |
| WO | WO 91 18739 A | 12/1991 |
| WO | 93/08239 | 4/1993 |
| WO | 94/03550 | 2/1994 |
| WO | 95/14746 | 6/1995 |
| WO | 96/08230 | 3/1996 |
| WO | 96/08367 | 3/1996 |
| WO | 96/08369 | 3/1996 |
| WO | 96/08539 | 3/1996 |
| WO | 97/33748 | 9/1997 |
| WO | WO 98 44064 A | 10/1998 |
| WO | 00/36042 | 6/2000 |

* cited by examiner

Primary Examiner—Robert Dawson
Assistant Examiner—Michael J Feely
(74) Attorney, Agent, or Firm—Christie, Parker & Hale, LLP

(57) ABSTRACT

PSAs and PSA constructions, such as self-adhesive labels, are provided, and exhibit good slittability and reduced adhesive build-up in printers, including laser printers. In one embodiment, a PSA has a storage modulus at 1000 radians/s and 25° C. of about $5 \times 10^6$ dyne/cm$^2$ or higher and a creep at 90° C. of about 125 or less. In one embodiment, the PSA is the polymerization product of a plurality of acrylic and other monomers.

27 Claims, 12 Drawing Sheets

(8 of 12 Drawing Sheet(s) Filed in Color)

LABEL ADHESIVES AND CONSTRUCTIONS EXHIBITING LOW ADHESIVE RESIDUE IN PRINTERS

CROSS-REFERENCE TO RELATED APPLICATION

This application claims priority of U.S. Provisional Patent Application No. 60/112,524, filed Dec. 15, 1998, the entire disclosure of which is incorporated herein by reference.

FIELD OF INVENTION

The present invention relates to pressure sensitive adhesives (PSAs) and self-adhesive labels. More particularly, the invention provides acrylic PSAs and constructions exhibiting improved convertibility and reduced adhesive build-up in printers.

BACKGROUND OF THE INVENTION

PSAs and self-adhesive labels are now used extensively in the home, in the office and in many commercial settings. In a typical construction, a removable release liner is coated with a PSA, which is laminated to a label face stock—typically an imprintable paper or plastic. Removal of the release liner allows the label to be adhered to a substrate. Such constructions are typically produced in large (e.g., 79 in. wide) rolls, which are then slit into smaller (e.g., 11 in. wide) rolls. Label sheets are made by cutting the resulting rolls into sheets, for example, 8½"×11" sheets, A4 sheets or 5"×8" sheets. Individual labels are fabricated by die-cutting and sheeting the construction.

A common problem with sheets of PSA labels is edge tackiness at the slit ends of the sheets, caused by the tendency of the PSA to flow or "ooze" under pressure, such as the pressures encountered during the slitting process and while the constructions are wound up in rolls. Edge tackiness of label sheets tends to adversely affect the performance of computer printers and copiers, which were really designed for printing on paper. The problem is particularly acute with thermal printers, such as laser printers and copy machines. Multi-layer sheets of self-adhesive labels tend to leave an adhesive residue in the printer in various locations, including the paper guides, nip rollers, photoreceptor drum, exit guides, and printer housing. The adhesive build-up inside the printer causes paper jams and poor print quality, and requires the printer to be serviced more frequently. Adhesive build-up in printers is especially a problem for high volume users of self-adhesive labels such as address labels.

Some attempts have been made to address the problem of edge tackiness and adhesive build-up in printers. One approach has been to coat only a portion of the release liner, leaving a gap where the sheet edges are to be cut, so that the final 8½×11 in. sheet has no adhesive coated within ⅜ in. of the sheet edge. This approach requires more expensive processing of the label construction. Another approach has been to matrix strip the label sheets, i.e., remove adhesive and face stock at the edge of the release liner. This approach similarly requires additional processing. What is needed is a PSA specifically designed to leave very little adhesive residue in the printers without sacrificing adhesion to envelopes, file folders, computer diskettes, audio/video tapes, corrugated cardboard, polyethylene, and other substrates.

SUMMARY OF THE INVENTION

According to the present invention, there are provided PSAs and PSA constructions that exhibit good slittability and reduced adhesive build-up in printers, even after thousands of sheets of such constructions have been fed through a printer. Preferably, the PSAs have a dynamic storage modulus, G', at 1000 radians/s and 25° C., of about $5 \times 10^6$ dyne/cm$^2$ or higher, pre about $6 \times 10^6$ dyne/cm$^2$ or higher. If the modulus is greater than $20 \times 10^6$ dyne/cm$^2$, the adhesion properties begin to decrease. Additionally, the PSAs have a creep (% strain) at 90° C. of about 125 or less, preferably about 100 or less, more preferably 60 or less, still more preferably 50 or less.

Storage modulus (G') of an adhesive is a measure of the elastic component of the modulus, or the energy stored and recovered in a dynamic mechanical measurement. Adhesive compositions with a sufficiently high storage modulus are less likely to be displaced by and less likely to adhere to cutting blades or dies used in slitting and converting processes. Excellent slittability has been achieved by confining the storage modulus of the PSA used in the present invention to about $5 \times 10^6$ dyne/cm$^2$ or higher.

Creep (% strain) is a measure of the deformation over time of an adhesive under a given stress at a constant temperature. Adhesive compositions with a relatively low creep have been found to exhibit better printer performance, i.e., result in less adhesive build-up in a laser printer.

In one embodiment of the invention, a new PSA comprises the polymerization product of a plurality of monomers, comprising, on a percent by weight basis, based on the total weight of monomers, (a) about 25 to 35% of at least one alkyl acrylate; (b) about 30 to 50% of a diester of a dicarboxylic acid; (c) about 20 to 30% of a vinyl monomer; (d) about 0.5 to 5% of an ethylenically unsaturated $C_3$ to $C_5$ carboxylic acid; (e) about 0.15 to 1% of a cross-linking monomer selected from the group consisting of multifunctional acrylate and methacrylate, epoxy-functionalized acrylate and methacrylate, and chelating acrylate and methacrylate; and (f) about 1 to 5% of a carboxy acrylate or methacrylate monomer, the homopolymer of which has a glass transition temperature below that of poly(acrylic acid).

In one embodiment, a PSA construction is made by applying the polymerization product to a flexible release liner or face stock and, in the case of an emulsion or solvent polymer, driving off the water or solvent. Linerless PSA constructions can also be made with the PSAs described herein.

The invention is also directed to a method for minimizing adhesive build-up in a printer caused by extended printing of adhesive labels. The method comprises selecting a PSA determined to have a storage modulus of at least about $5 \times 10^6$ dyne/cm$^2$ at 1000 radians/s and 25° C. and a creep (% strain) at 90° C. of less than about 125. A label construction comprising a release liner, the PSA coated on or applied to the release liner, and a face stock laminated to the PSA is prepared. The label construction is passed through a printer.

In another embodiment, the invention is directed to a method for minimizing adhesive build-up on a slitting blade during a PSA label-converting operation. The method comprises selecting a PSA determined to have a storage modulus of at least about $5 \times 10^6$ dyne/cm$^2$ at 1000 radians/s and 25° C. and a creep (% strain) at 90° C. of less than about 125. A label construction comprising a release liner, the PSA coated on or applied to the release liner, and a face stock laminated to the PSA is prepared. The label construction is slit with the blade, whereby the blade is in contact with the release liner, the PSA and the face stock.

DESCRIPTION OF THE DRAWINGS

These and other features of the advantages of the present invention will be better understood by reference to the following detailed description when considered in conjunction with the accompanying drawings. The file of this patent contains at least one photograph executed in color. Copies of this patent with color photograph(s) will be provided by the Patent and Trademark Office upon request and payment of the necessary fee.

DETAILED DESCRIPTION

Figure 1:
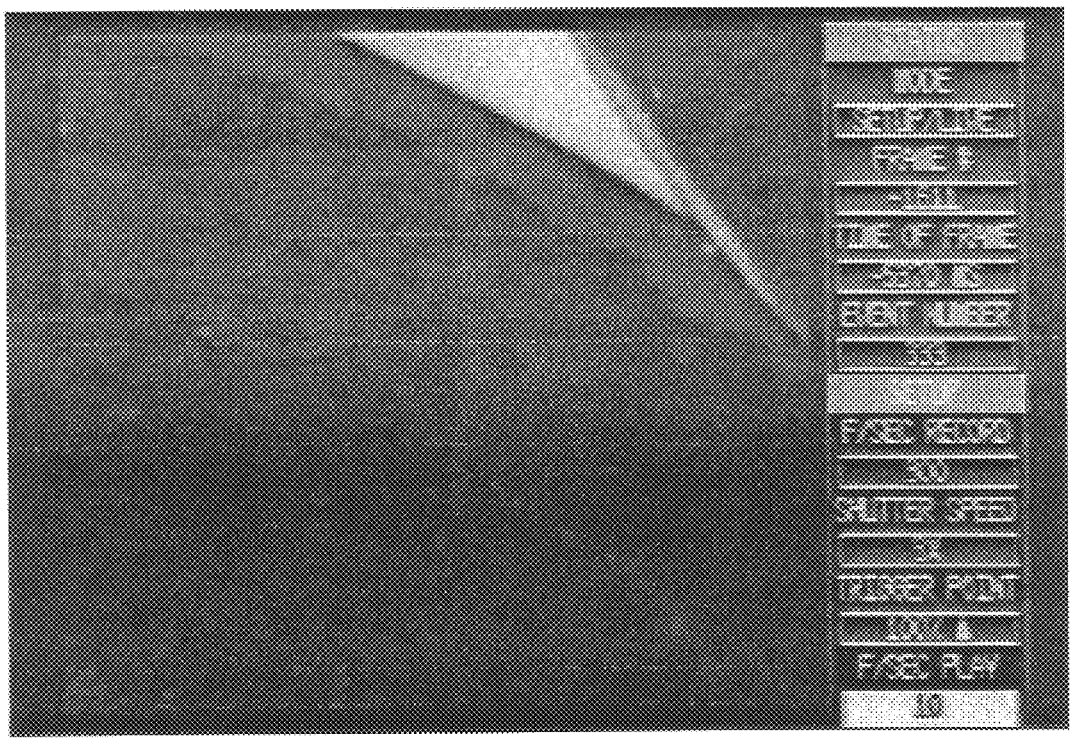
FIG. 1 is a frame from a video close-up of a slitting anvil showing the amount of build up of the adhesive of Example 1 on the anvil after slitting approximately 2400 feet.

According to a first aspect of the invention, there is provided a PSA which, when part of a self-adhesive label or similar construction, exhibits good slittability and reduced adhesive build-up in a printer when passed through the printer, while maintaining adhesive performance. Preferably, the PSA is characterized by a storage modulus, G', at 1000 radians/s and 25° C. reference temperature, of at least about $5 \times 10^6$ dyne/cm$^2$ or higher, preferably about $6 \times 10^6$ dyne/cm$^2$ or higher, and a creep (% strain) at 90° C. of about 125 or less, preferably about 100 or less, more preferably 60 or less, still more preferably 50 or less. In one embodiment, the PSA is an acrylic polymer, more preferably an acrylic polymer having a composition as described herein. The adhesive performance is indicated by its performance during a 90° peel test at room temperature on stainless steel and/or the glass transition temperature ($T_g$) of the adhesive. Preferably the construction, when comprising 50 lb uncoated, wood-free, sized 2-sides label stock, results in a paper tear during a 90° Peel test at room temperature on stainless steel after 10 minutes dwell with a force of about 1.0 lbs./in. More preferably, the construction, when comprising 50 uncoated, wood-free, sized 2-sides label stock, results in a paper tear during a 90° Peel test at room temperature on stainless steel after 10 minutes with a force of about 1.5 lbs./in. Still more preferably, the construction, when comprising 50 lb uncoated, wood-free, sized 2-sides label stock, results in a paper tear during a 90° Peel test at room temperature on stainless steel after 10 minutes with a force of about 2.0 lbs./in. The $T_g$ of the adhesive is preferably less than about 15° C., more preferably less than about 0° C., and most preferably less than −5° C.

In a second aspect of the invention, PSA constructions, such as self-adhesive labels, are provided, and consist of at least one layer of the new PSA, adhered to a face stock. The constructions preferably further comprise release liners adhered to the side of the PSA opposite the face stock.

In a third aspect of the invention, a method for reducing adhesive build-up in a printer is provided. The method comprises passing through the printer a PSA label comprising a release liner, a PSA coated on or applied to the release liner, and a face stock laminated to the PSA. The PSA has a storage modulus of at least about $5 \times 10^6$ dyne/cm$^2$ at 1000 radians/s and 25° C. and a creep (% strain) at 90° C. of less than about 125. It has been found that, when labels according to the invention are passed through a laser printer, the adhesive build-up in the printer is reduced compared to the use of labels not in accordance with the invention.

In a preferred embodiment, an acrylic emulsion PSA comprises, on a percent by weight basis, based on the total weight of the monomers: (a) about 25 to 35%, preferably 27 to 30%, of at least one alkyl acrylate; (b) about 30 to 50% of a diester of a dicarboxylic acid; (c) about 20 to 30% of a vinyl monomer; (d) about 0.5 to 5% of an ethylenically unsaturated $C_3$ to $C_5$ carboxylic acid; (e) about 0.15 to 1% of a cross-linking monomer selected from the group consisting of multifunctional acrylate and methacrylate, epoxy-functionalized acrylate and methacrylate, and chelating acrylate and methacrylate; and (f) about 1 to 5% of a carboxy acrylate or methacrylate monomer, the homopolymer of which has a glass transition temperature below that of poly(acrylic acid).

Preferably, the alkyl acrylate monomer(s) has from about 4 to about 8 carbon atoms in the alkyl group. Nonlimiting examples of suitable alkyl acrylates include butyl acrylate (BA), ethylhexyl acrylate (EHA), and isooctyl acrylate (IOA). In some embodiments, one or more alkyl methacrylates can also be included in the composition; nonlimiting examples of methacrylates include methylmethacrylate (MMA) and butylmethacrylate (BMA). Preferably, the total amount of all alkyl methacrylate monomers is preferably confined to less then about 10% by weight.

Two major components of the monomer mixture are a diester of a dicarboxylic acid and a vinyl monomer. Nonlimiting examples of diesters of a dicarboxylic acid useful in the practice of the present invention include di-2-ethylhexyl maleate (DOM) and other dioctyl maleates, di-2-ethylhexyl fumarate, and mixtures thereof. Nonlimiting examples of suitable vinyl monomers include vinyl acetate (VAc), vinyl butyrate, vinyl propionate, vinyl isobutyrate, vinyl valerate, vinyl versitate, and mixtures thereof.

A small amount of an ethylenically unsaturated $C_3$ to $C_5$ carboxylic acid (carboxylic acids having from 3 to 5 carbon atoms in the molecule) is included in the monomer mixture. Nonlimiting examples include acrylic acid (AA), methacrylic acid (MA), and itaconic acid.

A cross-linking monomer is included to impart crosslinkable sites to the resulting polymer. Nonlimiting examples include multifunctional acrylate and methacrylate (monomers having at least two or more acrylic or methacrylic acid or ester functionalities), for example, polyethyleneglycoldiacrylate, hexanedioldiacrylate, ethoxylated trimethylpropanetriacrylate, pentaerythritoltriacrylate and polypropyleneglycoldiacrylate; epoxy-functionalized acrylate and methacrylate, for example, glycidylmethacrylate; and chelating acrylate and methacrylate, for example, acetoacetoxyethylmethacrylate (AAEMA).

To impart a desired acid functionality to the polymer without raising the glass transition temperature too high, a small amount, e.g., from about 1 to about 5%, of a carboxy acrylate or methacrylate monomer, the homopolymer of which has a glass transition temperature below that of poly(acrylic acid), is added. Nonlimiting examples of such monomers include β-carboxyethyl acrylate (β-CEA); mono-2-acryloyloxypropylsuccinate, and mono-2-acryloyloxyethylphthalate.

Acrylic PSA polymers (more precisely, copolymers) are prepared using standard polymerization techniques, for example, free radical polymerization. Emulsion polymerization is preferred, but the reaction can also be run as a solvent polymerization, a bulk or hot melt polymerization, a radiation-induced polymerization on web, etc. In a preferred embodiment, an acrylic emulsion PSA is prepared by allowing the monomers to react in an oxygen-free atmosphere, in the presence of suitable polymerization initiators and emulsifiers (surfactants). Preferably, one or more activators and chain transfer agents (or other molecular weight regulators) are also employed in the reaction. Polymerization is controlled through selection and amount of monomers, chain transfer agents, etc. so that the overall gel content of the resulting polymer is between about 50 and 70%, with 60% being most preferred. Gel content represents the amount of polymer that is insoluble in tetrahydrofuran (THF), expressed as a percentage by weight. Although not bound by theory, it is believed that, if the gel content of the polymer is much less than about 50%, the creep (% strain) of the polymer will be too high, and the polymer will not perform well in printers. However, a polymer having a gel content between about 50 and 70% will not necessarily sufficiently minimize adhesive build-up in a printer unless the polymer also exhibits a low creep (% strain), as exhibited by Control 1, discussed in the Example section below.

Suitable polymerization initiators include, but are not limited to, persulfates, such as sodium persulfate ($Na_2S_2O_8$), potassium persulfate, and peroxy persulfates; and peroxides, such as tert-butyl hydroperoxide (t-BHP); used alone or in combination with one or more reducing components or activators, such as bisulfites, metabisulfites, ascorbic acid, erythorbic acid, sodium formaldehyde sulfoxylate, ferrous sulfate, ferrous ammonium sulfate, etc. The activator is believed to form a redox couple with the initiator, and promotes faster generation of free radicals.

Enough initiator is used to promote free-radical polymerization of the monomers. Preferably, a small amount of base, e.g., ammonium hydroxide, sodium hydroxide, sodium bicarbonate, etc., is added to the initiator. The base appears to stabilize the emulsion polymerization.

Preferred emulsifiers include both anionic and nonionic surfactants and stabilizers, including without limitation, alkyl phenol ethoxylates, such as nonylphenol ethoxylate (a nonionic surfactant sold as POLYSTEP F9 by Stepan Company Inc. of Winnetka, Ill.), alkylaryl sulfonates, such as sodium dodecylbenzene sulfonate (an anionic surfactant sold as Rhodacal DS10 by Rhone-Poulenc, of Cranbury, N.J.), Rhodacal A246L (an alpha olefin sulfonate available from Rhone-Poulenc), and Polystep B27 (alcohol ethoxyl sulfate, an ionic surfactant available from Stepan Company). Reactive surfactants can also be used, such as sodium vinyl sulfonate (SVS) (available from Air Products, Allentown, Pa.). The emulsifiers are employed in an amount sufficient to form stable monomer emulsions.

In some embodiments, a chain transfer agent or other molecular weight regulator is added to control average polymer chain length, crosslinking, and other properties of the acrylic copolymer. Nonlimiting examples include n-dodecyl mercaptan (n-DDM), t-dodecyl mercaptan (t-DDM), monothioglycerol, mercapto acetates, and long chain alcohols.

An important aspect of the present invention is labels and similar constructions made with the PSAs described herein. In one embodiment, the polymerization product is coated on or otherwise applied to a release liner, dried, and laminated to a paper, polymeric or other flexible face stock. In an alternate embodiment, the polymer is directly applied to a face stock, dried, and then laminated to a release liner. In still another embodiment, one or more additional layers of material are sandwiched between the release liner and face stock. For example, two different PSAs, one with and one without the preferred storage modulus and creep (% strain) characteristics, can be sandwiched between the release liner and face stock. Blends of two or more PSAs also can be used.

Nonlimiting examples of polymeric face stocks include polyolefins, such as polyethylene and polypropylene; polyesters, such as polyethylene terephthalate (PET); and polyvinyl chloride. Nonlimiting examples of paper face stocks include Kraft, bond, offset, litho paper, and sulfite paper, with or without a sizing or other surface treatment. Suitable release liners for laser label constructions can be paper or film coated with either solventless, solvent-based or water-based silicone. An example of a suitable release liner for use in connection with the present invention is Rhinelander brand super calendered kraft release liner (42#, 2.5 mil, coated with a Dow Corning solventless silicone).

Emulsion and solvent polymers can be coated using conventional coating techniques, including, without limitation, slot die, air knife, brush, curtain, excursion, blade, floating knife, gravure, kiss roll, knife-over-blanket, knife-over-roll, offset gravure, reverse roll, reverse-smoothing roll, rod, and squeeze coating. In general, the PSA is coated on a release liner or face stock, and the water or solvent is driven off, yielding a polymeric surface with a dry coat weight of preferably between about 17 and 25 g/m$^2$.

EXAMPLES

The following nonlimiting examples, 1 to 3, are illustrative of the present invention. Controls 1 to 4 are presented for comparison. Test methods used to measure modulus, creep, glass transition temperature ($T_g$), and adhesive properties (loop tack, peel and shear) are discussed below. Selected bulk properties of the adhesives, as well as performance characteristics of the PSA constructions, are presented in Tables 1 to 8.

Example 1

A PSA comprising an inherently tacky, acrylic polymer was prepared by emulsion polymerization, as follows. An emulsified monomer mixture consisting of 143.50 g 2-EHA, 215.00 g DOM, 125.00 g VAc, 5.00 g AA, 1.50 g AAEMA, 10.00 g β-CEA, 112.13 g H$_2$O, 45.70 g Polystep B27, and 2.30 g Polystep F9 was prepared, with stirring, and contained, on a percent by weight basis, based on the total weight of monomers, 28.7% 2-EHA, 25% VAc, 43% DOM, 1% AA, 0.3% AAEMA, and 2% β-CEA.

Separately, the following solutions of initiators, surfactants, and activators were prepared: Solution A—85.00 g H$_2$O, 6.00 g SVS, 0.35 g Polystep B27; Solution B—29.58 g H$_2$O, 0.92 g K$_2$S$_2$O$_8$; Solution C—82.72 g H$_2$0, 2.045 g K$_2$S$_2$O$_8$, 0.63 NaHCO$_3$; and Solution D—14.88 g H$_2$0, 0.365 g K$_2$S$_2$O$_8$.

A reaction vessel was purged with nitrogen, charged with all of Solution A, and heated to 73° C., with stirring (91 RPM). When the temperature reached 73° C., 20.13 g of Solution B was added over 10 min. (at a feed rate of 2.01 g/min.) and the reactor contents held for 3 min. or until the temperature again reached 73° C.

46.28 g of the premixed monomer mixture were added to the reactor over 20 min. (at a feed rate of 2.31 g/min.), together with the remainder of Solution B (at a feed rate of 0.52 g/min.). At the same time, the temperature was gradually raised to 79° C., and then maintained at 79° C. for 15 min.

The remainder of the monomer mixture was added to the reactor over 270 min. (at a feed rate of 2.28 g/min.), and Solution C was added simultaneously over 280 min. (at a feed rate of 0.305 g/min.), gradually raising the temperature to 82° C. and the stirring rate to 150 RPM. The temperature was then increased to 85° C.

After 30 min., half of Solution D was added, and the reactor contents were stirred for 45 min. The remainder of Solution D was added and the temperature was raised to 90° C. over 75 min. The reactor temperature was then cooled to 35° C., and the pH was lowered to 5.0 by dropwise addition of ammonia, followed by 10 min. more stirring.

A gel test was conducted to determine the gel content, i.e., the portion of the polymer that is insoluble in tetrahydrofuran. The adhesive was coated on a silicone release liner and dried at 70° C. for 10 min. The adhesive was then removed from the release liner, and a 75mg sample of the adhesive was accurately weighed and placed in a 10 micrometer polytetrafluoroethylene membrane filter. The edges of the filter were thermally sealed to contain the sample, and the filter was placed in a vial containing about 10 ml of the solvent. The vial was agitated for 24 hrs., and the filter was taken out of the solvent and dried at an elevated temperature for 20 min. The filter was weighed and the resulting weight of the sample was used to calculate the percent gel as follows:

% gel =(b/a)×100 where, a=total weight of polymer before treatment b=total weight of polymer after treatment The resulting emulsion polymer had a gel content of 60% by weight.

A PSA label was prepared by coating the polymer on a Rhinelander brand super calendered kraft release liner (42#, 2.5 mil, coated with a Dow Corning solventless silicone), drying the PSA-coated liner in an oven for 10 min at 70° C., and laminating it to a 50 lb uncoated, wood-free, sized 2-sides label stock. The PSA coat weight after drying was about 18 g/m$^2$.

Example 2

Using the release liner and face stock described in Example 1, a multilayer PSA label was prepared with a first acrylic emulsion polymer and a second acrylic emulsion polymer. The second emulsion polymer was prepared as described in U.S. Pat. No. 5,164,444, Example 3, the disclosure of which is incorporated herein by reference, which had a gel content of 65% by weight. The first acrylic emulsion polymer was prepared by emulsion polymerization as follows. An emulsified monomer mixture was prepared containing 327.5 g EHA, 20 g β-CEA, 150 g styrene, 2.5 g AAEMA, 110.8 g H$_2$O, and 50.3 g Polystep B27. Separately, the following solutions of initiators, surfactants, and activators were prepared: Solution A—73 g H$_2$O, 6 g SVS, and 0.35 g Polystep B27; Solution B—29.58 g H$_2$O and 0.92 g K$_2$S$_2$O$_8$; Solution C—82.72 g H$_2$O, 2.045 g K$_2$S$_2$O$_8$, and 0.63 g NaHCO$_3$; Solution D—14.88 g H$_2$O and 0.365 g K$_2$S$_2$O$_8$.

A reaction vessel was purged with nitrogen, charged with Solution A, and then heated to 73° C. with agitation. When the temperature reached 73° C., 20.13 g of Solution B were added to the reactor over 10 minutes (at a feed rate of 2.01 g/min). The reactor contents were held for 3 min or until the temperature again reached 73° C.

46.28 g of the premixed monomer were added to the reactor over 20 minutes (at a feed rate of 2.3 lg/min), together with the remainder of Solution B (at a feed rate of 0.52 g/min).At the same time, the temperature was gradually raised to 79° C. in increments of 1.5° C. every 5 minutes. The temperature was maintained at 79° C. for 15 min.

The remainder of the monomer mixture was added to the reactor over 270 min (at a feed rate of 2.28 g/min), and Solution C was added simultaneously over 280 min. (at a feed rate of 0.305 g kg/min), gradually raising the temperature to 82° C. and the agitation rate to 150 rpm. The temperature was then increased to 85° C. After 30 min., half of Solution D was added, and the reactor contents were held for 45 min. The remainder of Solution D was added, and the temperature was raised to 90° C. over 75 min. The reactor temperature was then cooled to 35° C., and the pH was lowered to 5.0 by the addition of ammonia, followed by 10 min. more stirring. Kathon was added, mixing was continued, and the mixture was filtered. The gel content of the polymer was 78%.

The two PSAs were simultaneously coated on the release liner with a dual die coater, and then laminated to the face stock. The first adhesive was adjacent to the face stock and is referred to as the face side adhesive (FSA). The second adhesive was adjacent to the release liner, and is referred to as the liner side adhesive (LSA). The dried coat weight of the adhesives (in combination) was about 18 g/m$^2$.

Example 3

Using the method, release liner, and face stock identified in Example 1, a PSA label was prepared with a blend of two PSAs described below. The dried coat weight of the PSA was about 18 g/m$^2$.

A repulpable emulsion acrylic copolymer was prepared by sequential polymerization using the polymerization described below. An initial reactor charge C was prepared containing 120 g H$_2$O (DI), 0.1 g Fe(EDTA), 30 g AR150, 10 g SVS, and 7.5 g H$_2$O$_2$. A multi-necked reaction vessel equipped with nitrogen inlet valve, stirrer and thermometer was charged with initial reactor charge C, a deionized water solution of surfactants, hydrogen peroxide and FeEDTA, and the temperature raised to 70° C. for 30 minutes. In four separate vessels, surfactant solutions A1 and A2 and monomer mixes B1 and B2 were prepared. Surfactant solution A1 contained 90 g DI water, 20.0 g J927, and 1.875 g sodium bicarbonate. Surfactant solution A2 contained 61.8 g DI water, 28.03 g J927, and 1.875 g sodium bicarbonate. Monomer mix B1 contained 50 g EHA, 95.64 g BA, 70 g VAc, 25.0 g MA, 6.0 g MAA, 23.0 g AA, and 0.15 g nDDM. Monomer mix B2 contained 168.75 g EHA, 25.0 g MA, 5.0 g AA, 30.0 g MAA, and 1.25 g nDDM. Pre-emulsions I and II were prepared by mixing soap solution A1 and monomer mix B1, and soap solution A2 and monomer mix B2, respectively. Catalyst charge D, containing 2.25 g K$_2$S$_2$O$_8$ (KPS), 9.0 g NaHCO$_3$, and 10.0 g DI water, was added to the reactor, at 70° C. and mixed for 10 minutes. Accelerator solution E was prepared containing 90 g DI water and 0.75 g AWC, and catalyst solution F was prepared containing 0.78 g KPS and 1.8 g t-BHP. 32 grams of pre-emulsion I and 4.5 g of accelerator solution E were added to the reactor over 15 minutes. After a delay of 10 minutes, pre-emulsion I, half of accelerator solution E, and half of catalyst solution F were then fed into the reactor over a 90 minute period. Pre-emulsion II, and the remainder of solutions E and F were fed into the reactor, over a 90 minute period. After completion of the monomer and catalyst feeds, the reactor was held at 70° C. for an additional 60 minutes to cook off any residual monomers. Separate aqueous solutions G1, containing 0.5 g t-BHP, and G2, containing 2.0 g DI water and 0.15 g ascorbic acid, were introduced to the reactor in two stages. First, one half of G1 and G2 was added, followed 15 minutes later by the other of G1 and G2. The reactor was held at 70° C. for 30 minutes, and then cooled to 35° C. A biocide, Kathon LX, available from Rohm & Haas Company, Inc. (Philadelphia, Pa.) was added to the reactor as a 1.5% aqueous solution. The resulting repulpable emulsion acrylic copolymer had a pH of from about 5 to 6, more preferably from about 5.2 to 5.5.

The repulpable emulsion copolymer was blended at 60% level with a polymer similar to Polymer B described in U.S. Pat. No. 5,536,800, the disclosure of which is incorporated by reference herein.

Controls 1 to 4

Using the method, release liner, and face stock identified in Example 1, Controls 1 to 4, were prepared, with the following PSAs:

Control 1—the acrylic emulsion adhesive identified as the FSA in Example 2.

Control 2—an acrylic emulsion adhesive prepared from an emulsion acrylic copolymer prepared from a monomer mixture containing (i) about 10 to 20 parts 2-ethylhexyl acrylate (EHA), (ii) about 60 to 80 parts butyl acrylate (BA), (iii) about 2 to 10 parts methyl acrylate (MA), (iv) about 2 to 10 parts vinyl acetate (VA), (v) about 1 to 5 parts acrylic acid (AA), and (vi) about 1 to 5 parts methacrylic acid (MAA). To the resulting emulsion acrylic copolymer was added(i) 12% Snowtack 301A (Eka Nobel) and (ii) 6% of an emulsion acrylic polymer as generally described in Example E10 of U.S. Pat. No. 5,536,800, the disclosure of which is incorporated herein by reference.

Control 3—an acrylic emulsion PSA similar to Control 1, but with a tackifying component (and similar to the PSA of Example 18M of U.S. Pat. No. 5,623,011, the disclosure of which is incorporated by reference herein).

Control 4—an acrylic emulsion blend of 60% of Example E-16 and 40% Polymer B described in U.S. Pat. No. 5,536,800, the disclosure of which is incorporated by reference herein.

Test Methods and Results

In separate tests, the adhesives and label constructions described above were evaluated for dynamic storage modulus (G' at 1000 radians/s and 25° C.), creep (% strain) at 90° C., glass transition temperature ($T_g$), slittability (adhesive build-up on the slitting blades and anvils), printer performance (adhesive build-up in a laser printer), and adhesive performance (loop tack, peel, and shear), using the following procedures. A description of the theory relating to the measurement of modulus and creep is provided in "Viscoelastic Properties of Polymers", John D. Ferry, $3^{rd}$ Edition, John Wiley & Sons, 1980, the disclosure of which is incorporated by reference herein.

Dynamic Storage Modulus

The dynamic storage modulus at 1000 radians/s and 250° C. was determined from a master curve generated on an RMS800 rheometer by Rheometric Scientific, Inc. (Piscataway, N.J.). The master curve (or dynamic mechanical spectrum) was plotted over a frequency of $10^{-8}$ to $10^{10}$ radians/s. A sample of dried adhesive 1 to 2 mm thick was used in 8mm and 25mm diameter parallel plates, and the reference temperature was 26±1° C. As used herein, unless otherwise indicated, the term "storage modulus" refers to the storage modulus as determined as described above.

Creep at 90° C.

The creep (%strain) was measured on a DSR500 rheometer by Rheometric Scientific, Inc. (Piscataway, N.J.). A sample of dried adhesive 1 to 2 mm thick was used in 25 mm diameter parallel plates. The creep (% strain) of the sample was measured under a load of 500 Pa at 90° C. for 20 min. As used herein, unless otherwise indicated, the term "creep (% strain)" refers to the creep as determined as described above.

Glass Transition Temperature

The glass transition temperature, Tg, i.e., the temperature at which the polymer changes from a glassy to a rubbery state, was taken as the temperature at which the maximum tangent delta occurs in a temperature sweep from –80° C. to 100° C. at a frequency of 10 radians/s generated on an RMS800 by Rheometric Scientific, Inc. (Piscataway, N.J.).

The results of the modulus, creep, and Tg measurements are presented in Table 1.

TABLE 1

Modulus, Creep and Glass Transition Temperature of Selected PSA's

| Sample | G' at 1000 radians/s & 25° C. (dyne/cm$^2$) | Creep at 90° C. (% strain) | $T_g$ ° C. |
|---|---|---|---|
| PSA of Ex. 1 | 6.7 × 10$^6$ | 41 | –6 |
| FSA of Ex. 2 | 6.9 × 10$^6$ | 53 | –6 |
| PSA of Ex. 3 | 12.0 × 10$^6$ | 56 | –4 |
| PSA of Con. 1 | 4.4 × 10$^6$ | 69 | –11 |
| PSA of Con. 2 | 3.1 × 10$^6$ | 172 | –22 |
| PSA of Con. 3 | 2.7 × 10$^6$ | 242 | –13 |
| PSA of Con. 4 | 16.1 × 10$^6$ | 504 | 10 |

Adhesive Build-Up During Slitting

An overall rating of adhesive build-up during the slitting process (low, medium, and high) was assigned to each PSA based on a visual examination of the slitting blades and anvils and a gravimetric analysis of adhesive build-up. Each label construction was prepared as a 25 in. wide, 1700 ft. or 2500 ft. long roll, and then slit into smaller, 11 in. wide rolls, which were then cut into 8½ in.×11 in. sheets. Slitting was accomplished with 3 pairs of stainless steel blades and anvils, set at a 0.5 blade-to-anvil cant angle and a 0.0625 in. overlap. (The actual, measured overlap ranged from 0.037 to 0.077 in.) The side load pressure was kept constant throughout the slitting process. The rolls were slit at a web speed of 400 ft./min., with high speed (500 frames/s) video close-ups of the blades and anvils taken every 500 ft. Using a razor blade and weighing paper, the adhesive residue on the blades and anvils was removed and weighed after slitting each 2500 ft. long roll.

The adhesive buildup rating was made by assigning a value of none (0), low (1), medium (2), high (3), or very high (4) to the amount of adhesive build-up on the blades and anvils. Thus, for each test, 6 total ratings were given (3 anvil ratings and 3 blade ratings), permitting a maximum subjective rating of 24, with a low rating indicative of good slittability, i.e., low adhesive build-up. The results of two tests are presented in Tables 2 and 3.

Figure 2:
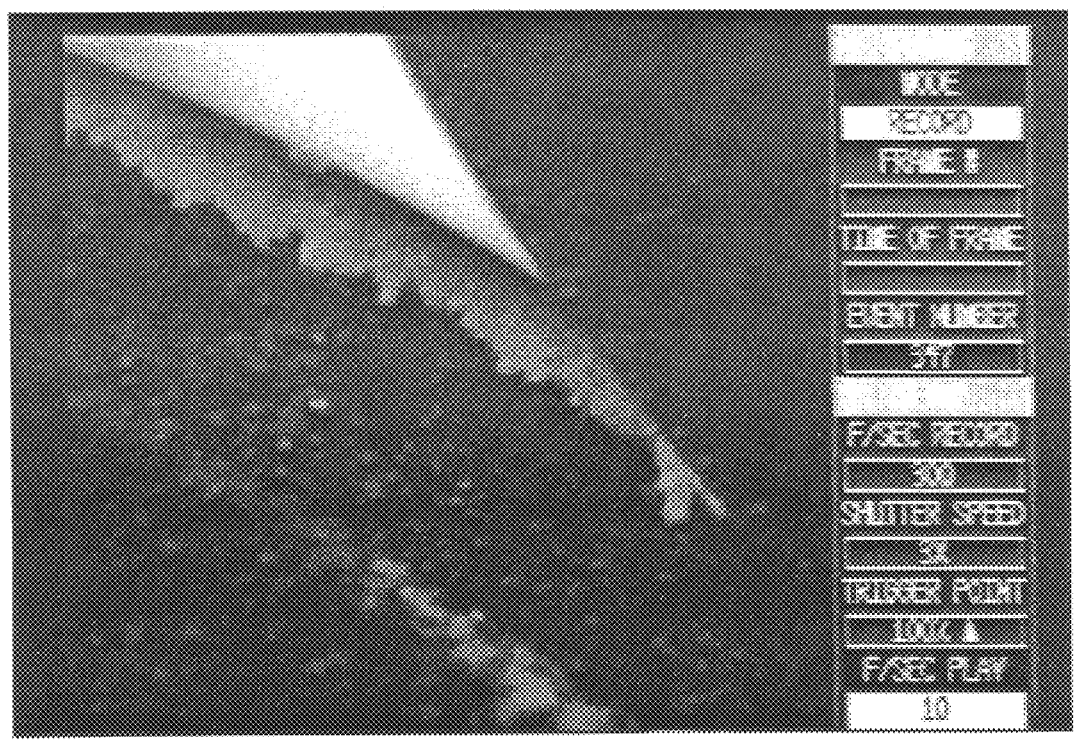
FIG. 2 is a frame from a video close-up of a slitting anvil showing the amount of build up of the adhesive of Example 3 on the anvil after slitting approximately 2200 feet.
Figure 3:
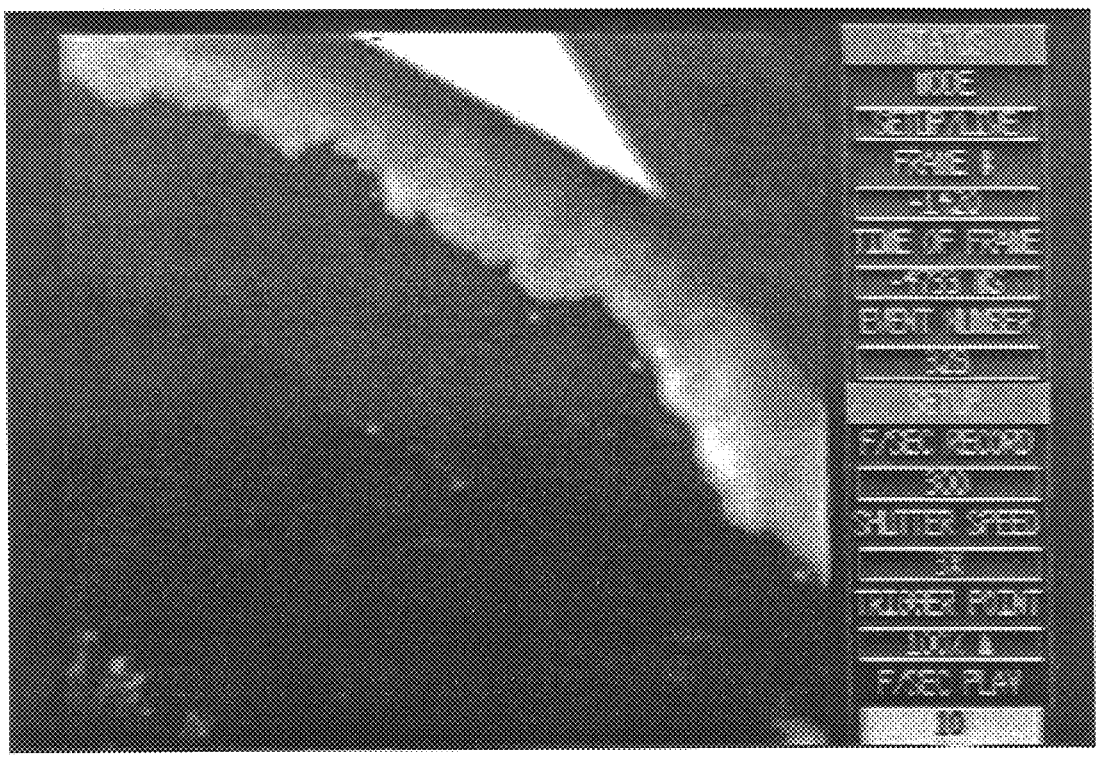
FIG. 3 is a frame from a video close-up of a slitting anvil showing the amount of build up of the adhesive of Control 1 on the anvil after slitting approximately 2400 feet.
Figure 4:
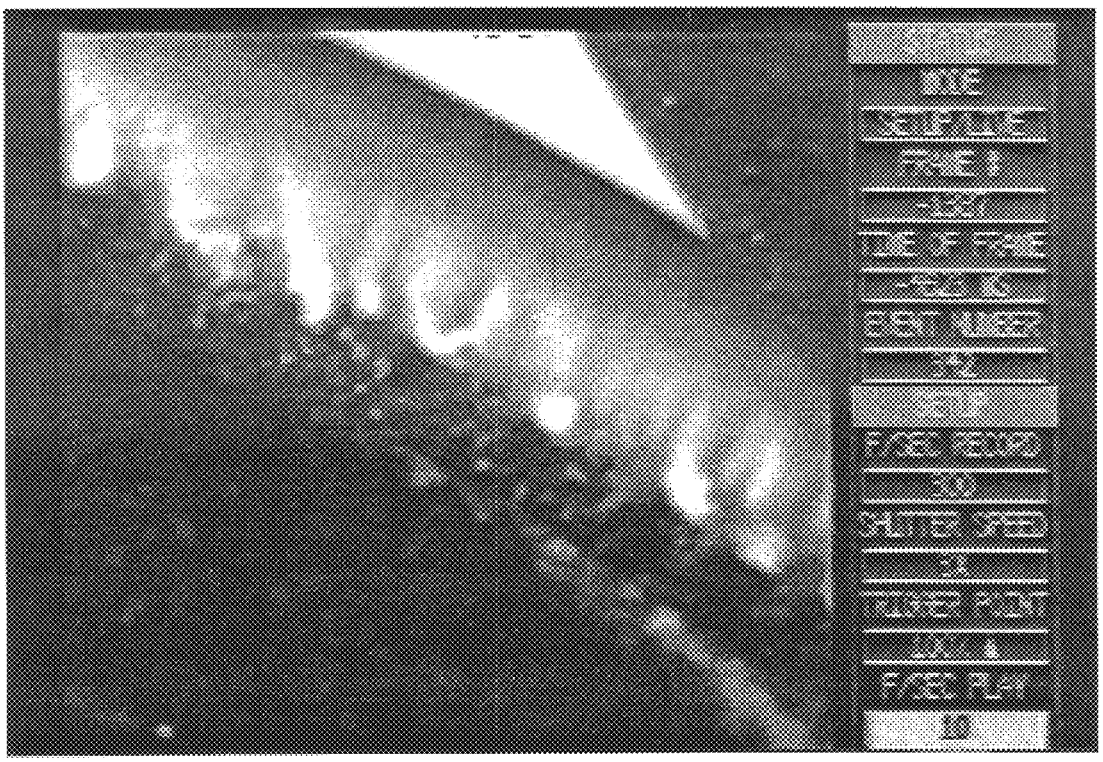
FIG. 4 is a frame from a video close-up of a slitting anvil showing the amount of build up of the adhesive of Control 2 on the anvil after slitting approximately 2400 feet.

Frames of video close-ups of the slitting anvil are presented in FIGS. 1 to 4. FIG. 1 illustrates the small amount of the adhesive of Example 1 that built-up on the anvil after approximately 2400 feet. FIG. 2 illustrates the small amount of the adhesive of Example 3 that built-up on the anvil after approximately 2200 feet. FIGS. 3 and 4 illustrate the large amount of Control adhesives 1 and 2, respectively, that built-up on the anvil after approximately 2400 feet.

TABLE 2

Slitting Performance of Selected PSA's-Test 1

| Construction | Adhesive Build-up (Subj. Rating) | Adhesive Build-up (Grams) | Adhesive Build-up (Overall Rating) |
|---|---|---|---|
| Ex. 1 | 6.5 | 0.081 | low |
| Ex. 3 | 3.5 | 0.043 | low |
| Con. 1 | 13 | 0.168 | medium |
| Con. 2 | 18 | 0.401 | high |

TABLE 3

Slitting Performance of Selected PSA's-Test 2

| Construction | Adhesive Build-up Rating | Adhesive Build-up (Grams) | Adhesive Build-up (Overall Rating) |
|---|---|---|---|
| Ex. 1 | 4.5 | 0.028 | low |
| Ex. 2 | 13 | 0.107 | medium |
| Ex. 3 | 5 | 0.040 | low |
| Con. 1 | 11 | 0.073 | medium |
| Con. 3 | 13 | 0.120 | medium |
| Con. 4 | 9 | 0.060 | low |

Printer Performance/Adhesive Build-Up in Printer

To evaluate the printer performance of the new adhesives and controls, 3500 sheets of label constructions of each of the Examples and Controls, prepared as described above, were fed through a Hewlett Packard 4Plus laser printer, which was then examined for adhesive build-up. To facilitate the visual inspection, 200 ppm of a fluorescent dye, Tinopal SFP (available from Ciba-Geigy) was blended into each adhesive prior to coating. Using UV light for illumination, photographs of the back interior chamber housing (the area of the printer after the fuser, where the printer housing deflects the sheets up and out of the printer), were taken after every 500 sheets. Based on a visual examination of the photographs, an assessment of adhesive build-up (none, very low, low, medium, or high) was recorded after every 500 sheets, for each PSA construction. In addition, "black-out" and "whiteout" sheets (sheets with 100% and 0% toner coverage, respectively) were printed and visually inspected for spots and defects (indicative of adhesive build-up on the photoreceptor of the printer). Based on the photographs and the black-out and white-out tests, an overall printer adhesive build-up rating (low, medium, or high) was assigned to each PSA construction. The results of two tests are presented in Tables 4 and 5.

Figure 5A:
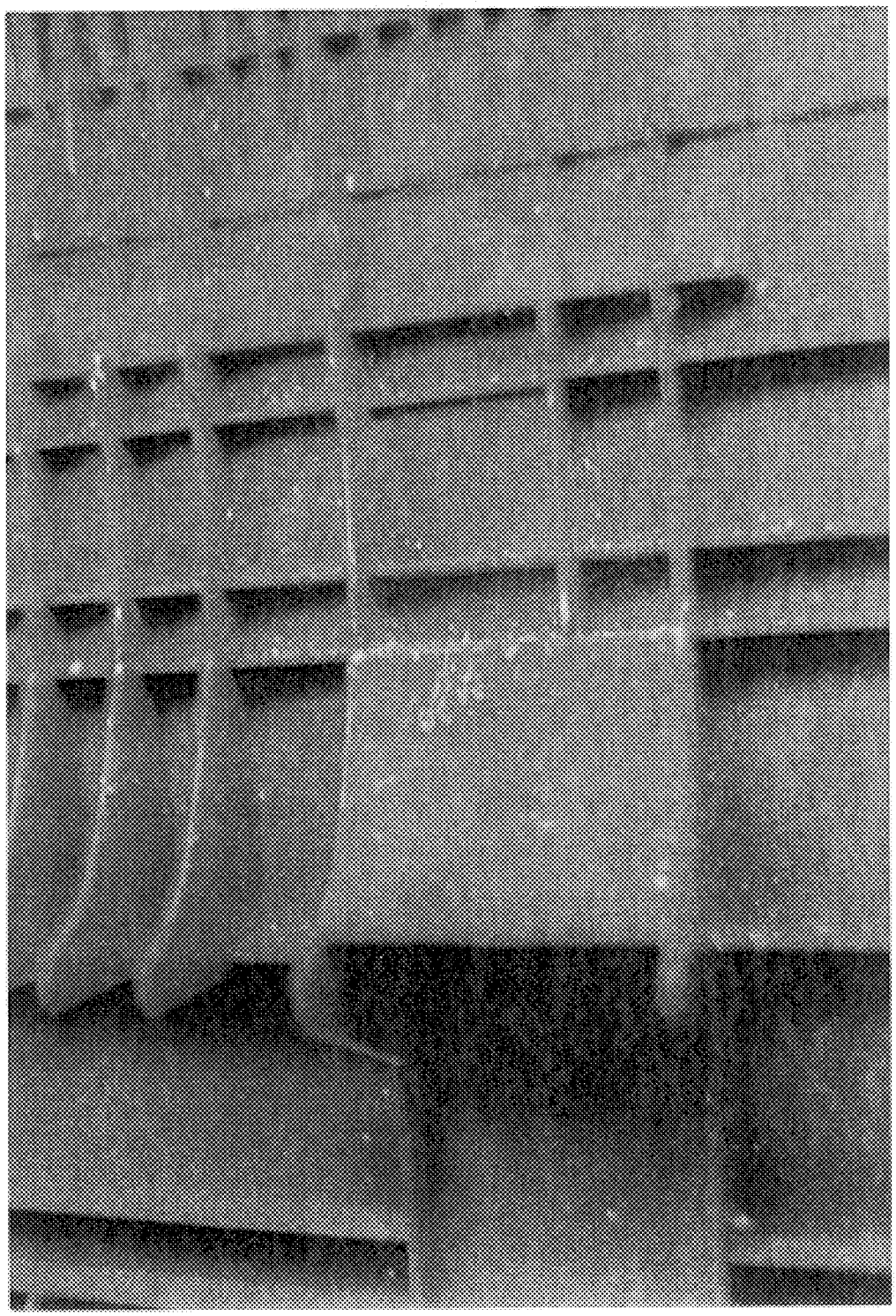
FIG. 5A depicts the amount of build up of the adhesive of Example 1 in the printer after 2000 sheets.
Figure 5B:
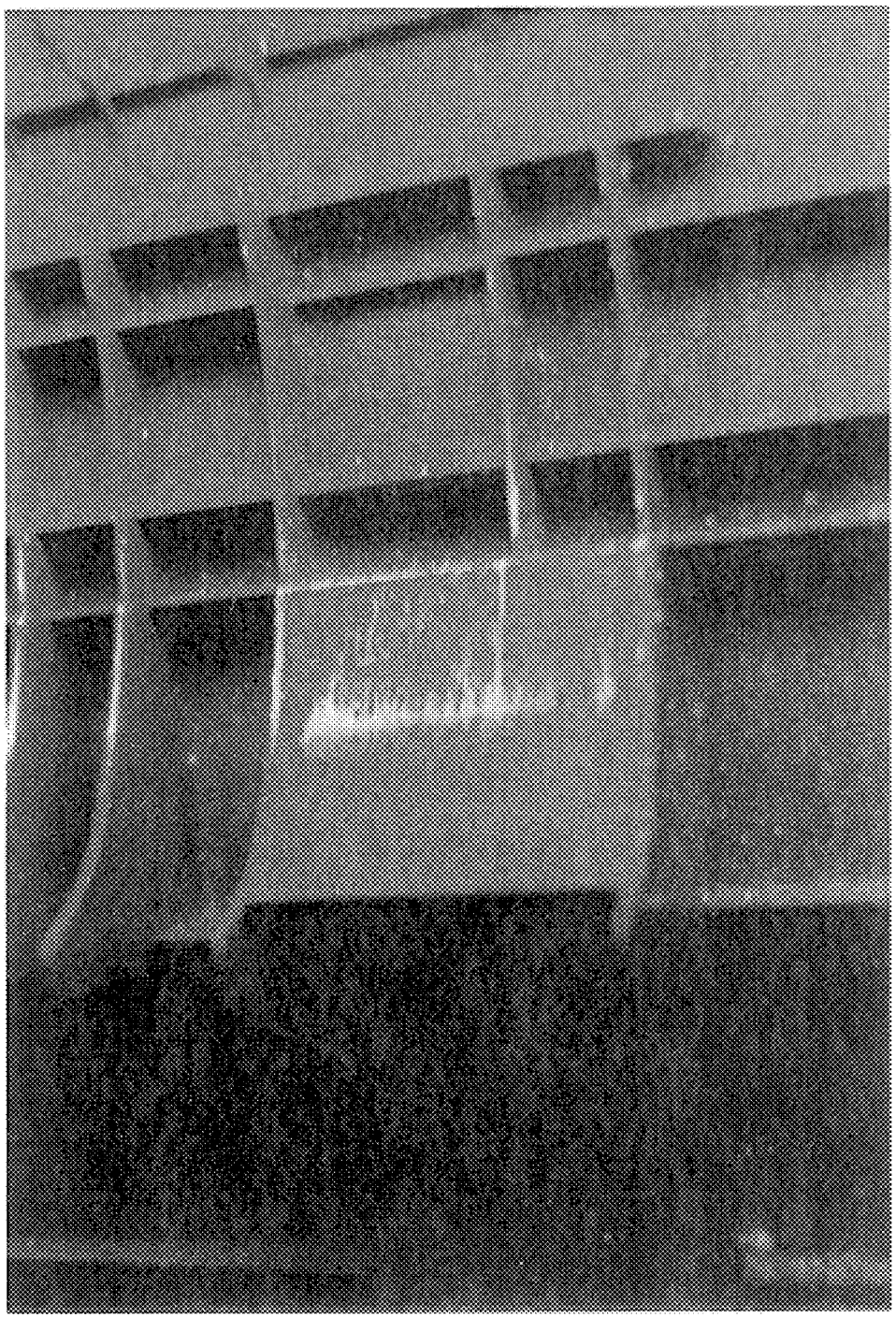
FIG. 5B depicts the amount of build up of the adhesive of Example 1 in the printer after 3500 sheets.
Figure 6A:
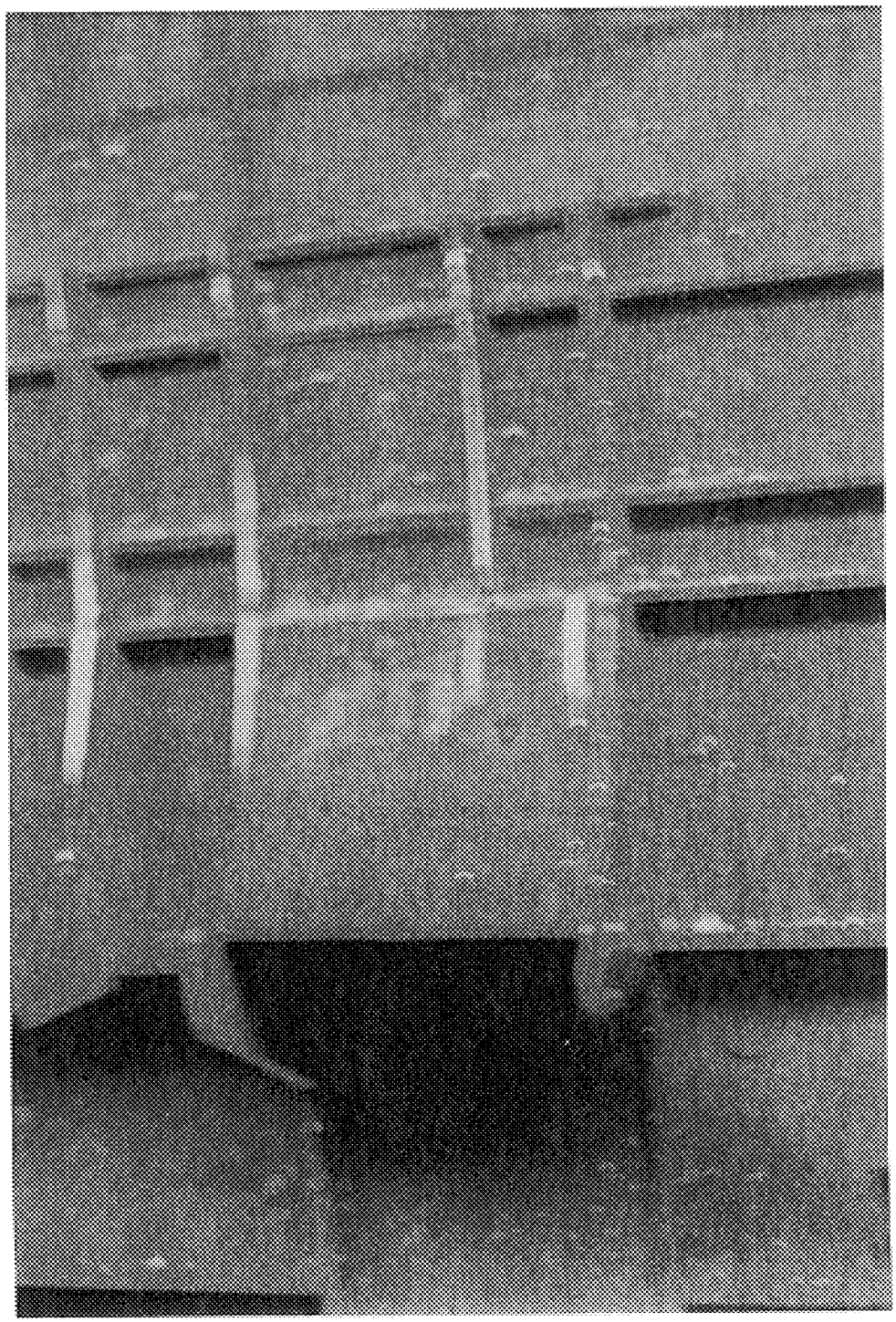
FIG. 6A depicts the amount of build up of the adhesive of Example 3 in the printer after 2000 sheets.
Figure 6B:
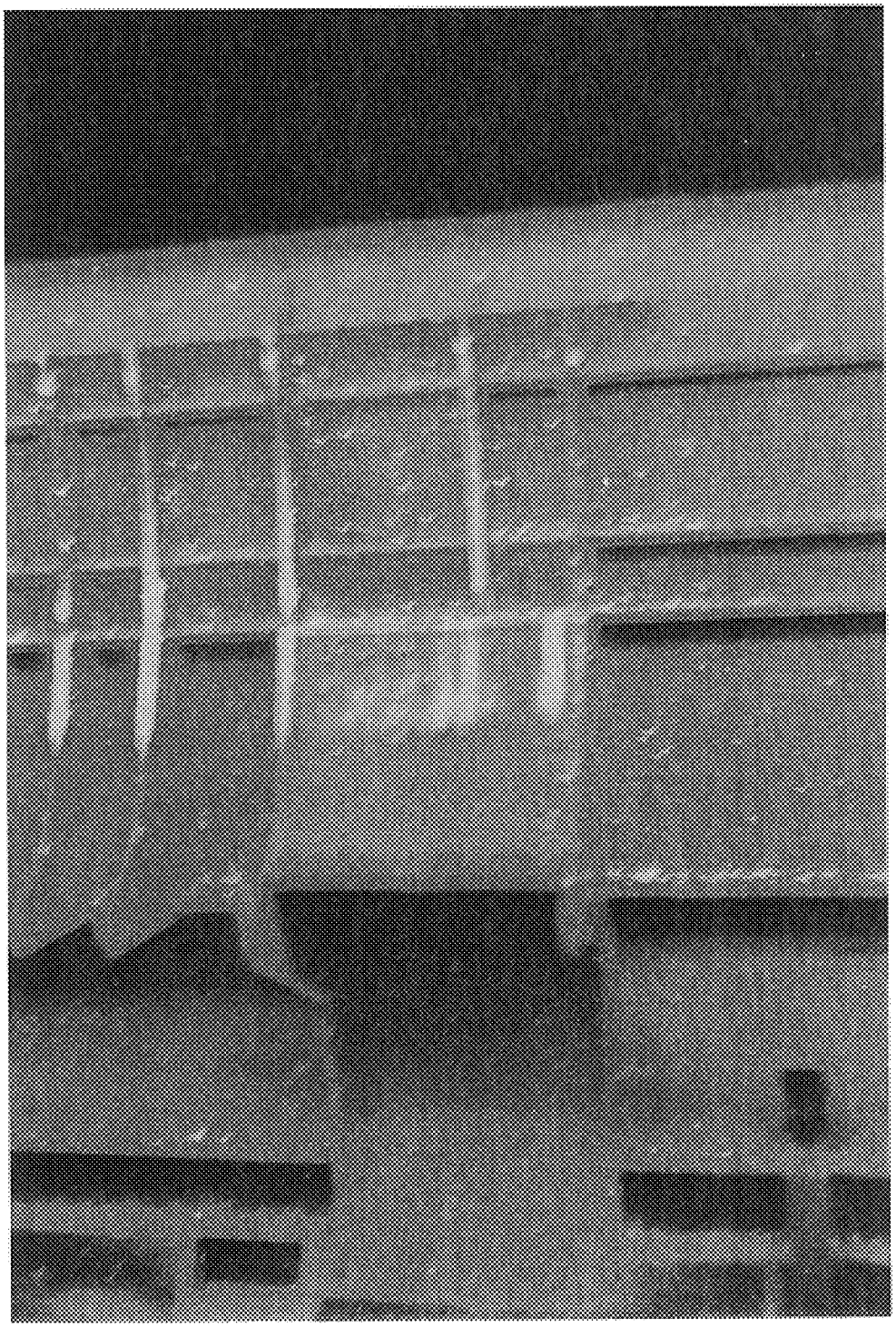
FIG. 6B depicts the amount of build up of the adhesive of Example 3 in the printer after 3500 sheets.
Figure 7A:
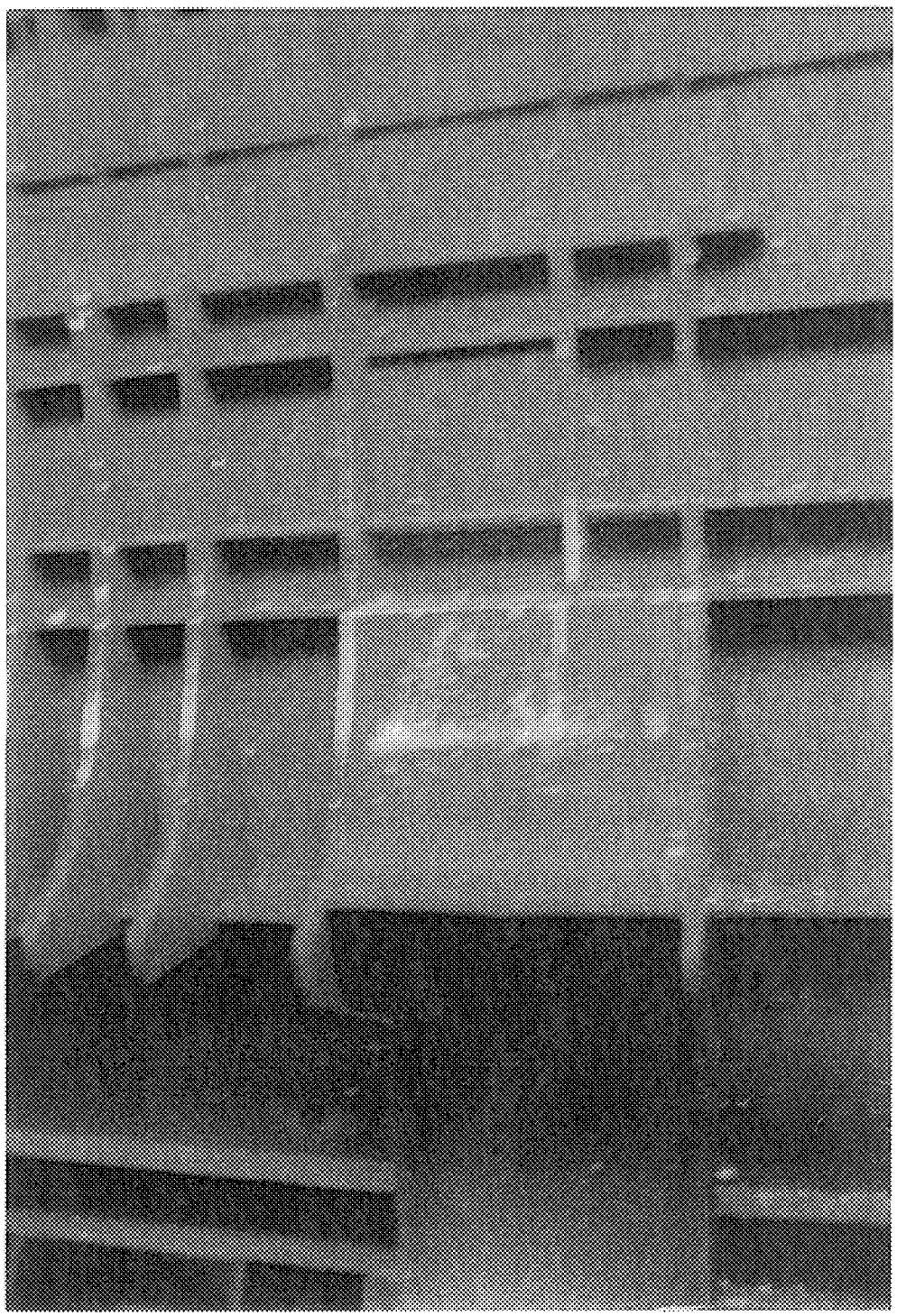
FIG. 7A depicts the amount of build up of the adhesive of Control 1 in the printer after 1900 sheets.
Figure 7B:
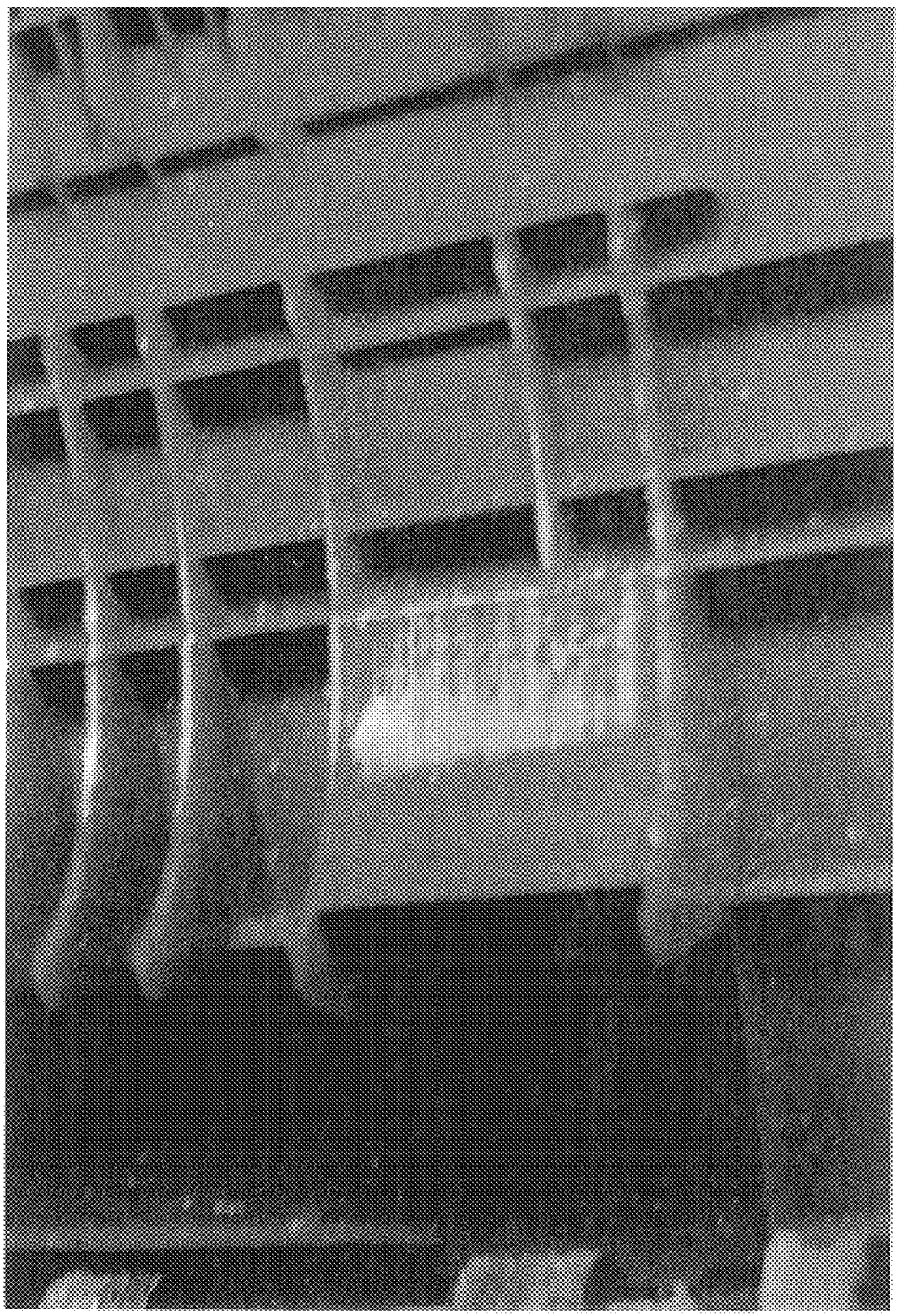
FIG. 7B depicts the amount of build up of the adhesive of Control 1 in the printer after 3500 sheets.
Figure 8A:
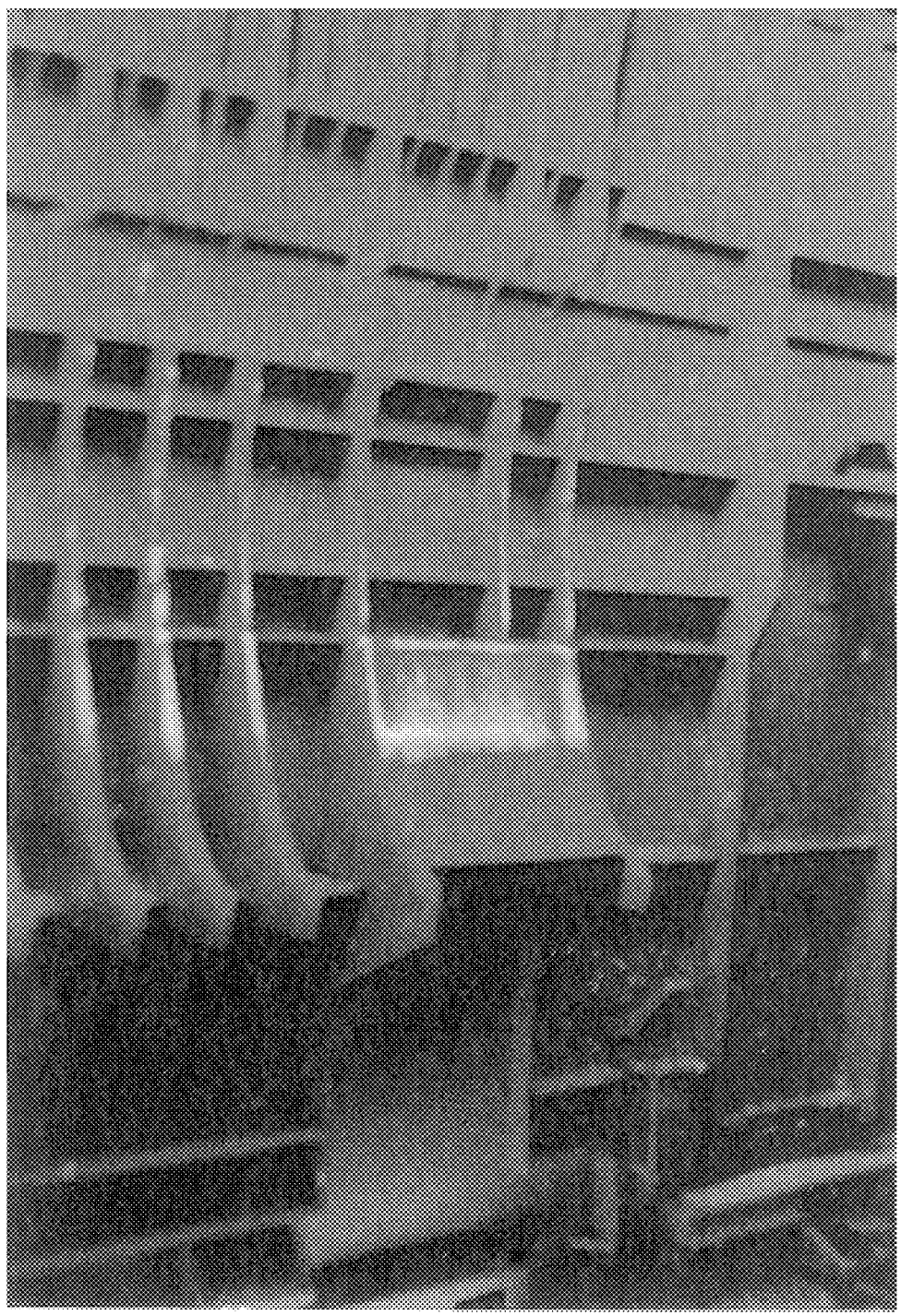
FIG. 8A depicts the amount of build up of the adhesive of Control 2 in the printer after 2000 sheets.
Figure 8B:
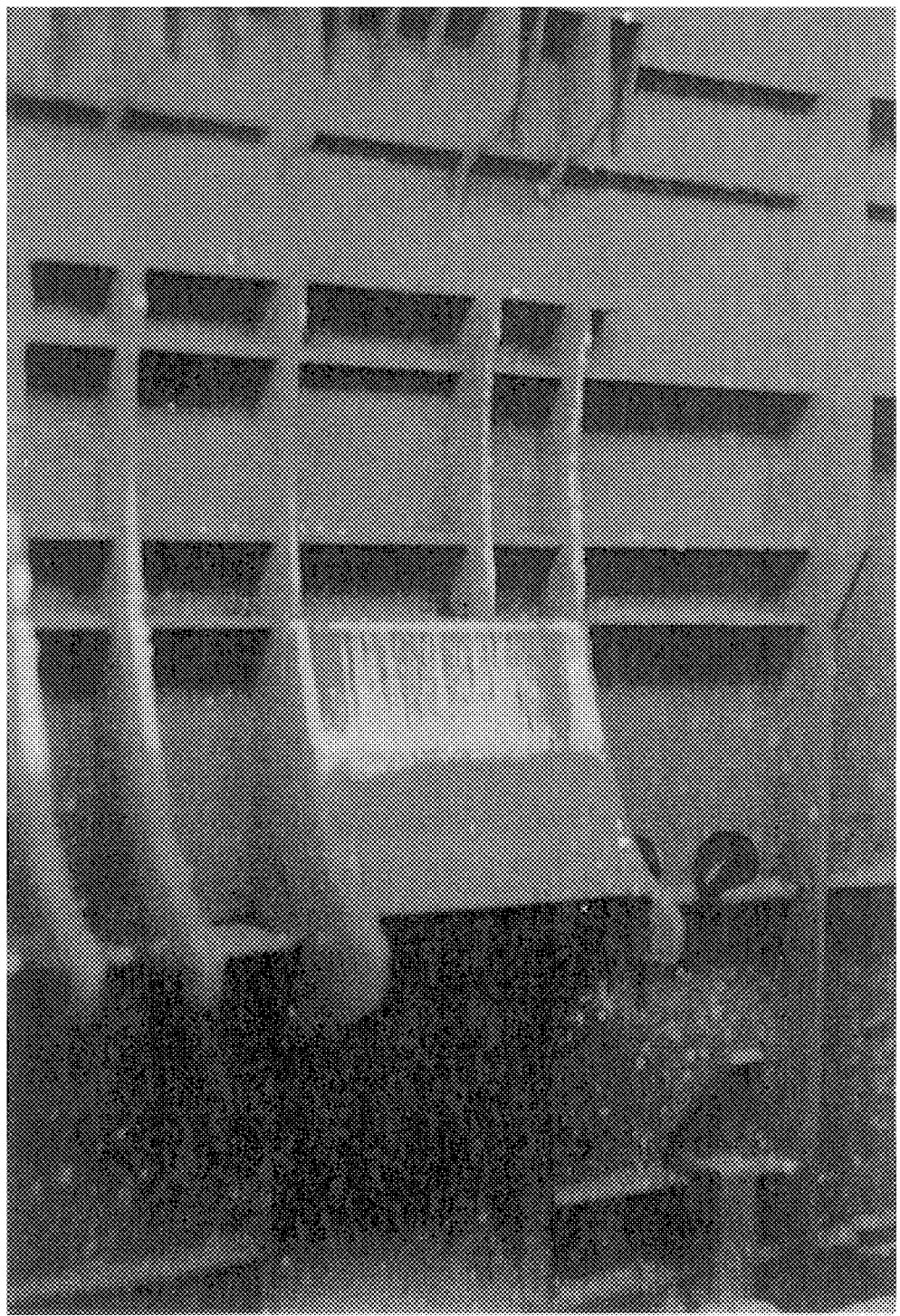
FIG. 8B depicts the amount of build up of the adhesive of Control 2 in the printer after 3500 sheets.

Photographs of the adhesive build-up in the printer are presented as FIGS. 5A to 8B. FIGS. 5A and 5B depict that the small amount of the adhesive of Example 1 that built-up in the printer after 2000 sheets and 3500 sheets, respectively. FIGS. 6A and 6B depict that the relatively small amount of the adhesive of Example 3 that built-up in the printer after 2000 sheets and 3500 sheets, respectively. FIGS. 7A and 7B depict that the relatively large amount of the adhesive of Control 1 that built-up in the printer after 1900 sheets and 3500 sheets, respectively. FIGS. 8A and 8B depict that the relatively large amount of the adhesive of Control 2 that built-up in the printer after 2000 sheets and 3500 sheets, respectively.

TABLE 4

Printer Performance of Selected PSA's - Test 1

Adhesive Build-up and Overall Rating

| Sample | 500 | 1000 | 1500 | 2000 | 2500 | 3000 | 3500 | Overall Build-up Rating |
|---|---|---|---|---|---|---|---|---|
| Ex. 1 | none | very low | very low | very low | low | low | low | low |
| Ex. 3 | very low | very low | very low | low | low | low | low | low |
| Con. 1 | very low | very low | very low | low | med. | med. | med. | med. |
| Con. 2 | med. | med. | high | high | high | high | high | high |

TABLE 5

Printer Performance of Selected PSA's - Test 2

Adhesive Build-up and Overall Rating

| Sample | 500 | 1000 | 1500 | 2000 | 2500 | 3000 | 3500 | Overall Build-up Rating |
|---|---|---|---|---|---|---|---|---|
| Ex. 1 | none | none | none | very low | very low | very low | very low | very low |
| Ex. 2 | none | none | very low | very low | very low | very low | — | very low |
| Ex. 3 | none | none | none | none | none | none | — | none |
| Con. 1 | — | very low | very low | very low | low | low | med. | med. |
| Con. 3 | very low | low | med. | very high | — | — | — | very high |
| Con. 4 | low | very high | — | — | — | — | — | very high |

Substrate Adhesion

The Substrate Adhesion tests were conducted to determine the ability of a label to adhere to a variety of substrates that are commonly used in the office environment. The substrates include a white Xerox paper, #10 white envelopes, brown mailing envelopes, white Tyvek envelopes, corrugated board, manila file folders, and computer diskettes. The adhesive constructions were die cut in the machine direction to 1×2.5 inch samples. The liner was removed, and the labels were manually applied to each substrate. Each label was rolled down twice using a 2 kg (4.51 lb.) rubber covered roller. For diskette application, the label was applied over the edge of the diskette. The labels were tested initially (after 20 min.), after aging at room temperature for 1 week and 2 weeks and after aging at 60° C. for 1 week and 2 weeks.

After the correct test period, the labels were evaluated for lift then removed from the substrate and given a ranking according to following guidelines:

10) lift<1/64", the label did not tear but the substrate tore or the label tore and pulled many fibers from the substrate;
9) lift<1/32", the label did not tear but pulled many fibers from the substrate or the label tore and pulled few fibers;
8) lift<2/32", the label did not tear but pulled a few fibers from the substrate or the label tore and pulled very few fibers;
7) lift<3/32", the label did not tear but pulled very few fibers from the substrate or the label tore and pulled very, very few fibers;
6) lift<4/32", the label does not tear but pulled very, very few fibers from the substrate or the label tore and pulled no fibers;
5) lift<5/32", the label did not tear and pulled no fibers from the substrate;
4) lift<6/32", the label did not tear and pulled no fibers from the substrate;
3) lift<7/32", the label did not tear and pulled no fibers from the substrate;
2) lift<8/32", the label did not tear and pulled no fibers from the substrate;
1) lift>8/32", the label did not tear and pulls no fibers from the substrate.

A rating of 6 or above is acceptable for permanent adhesion. Samples were tested in triplicate for each test period. The results are shown in Table 6 below.

TABLE 6

| adhesive | initial, 20 min. | 1 wk RT | 2 wk RT | 1 wk 60° C. | 2 wk 60° C. |
|---|---|---|---|---|---|
| Substrate: Xerox paper | | | | | |
| Control 1 | 10 | 9 | 10 | 9 | 10 |
| Example 1 | 10 | 9 | 9 | 10 | 10 |
| Example 3 | 8 | 10 | 10 | 9 | 10 |
| Control 2 | 10 | 10 | 10 | 10 | 10 |
| Example 2 | 10 | 10 | 10 | 10 | 10 |
| Control 4 | 9 | 10 | 10 | 10 | 10 |
| Substrate: #10 white envelope | | | | | |
| Control 1 | 10 | 10 | 10 | 10 | 10 |
| Example 1 | 10 | 10 | 9 | 10 | 9 |
| Example 3 | 1 | 10 | 9 | 10 | 10 |
| Control 2 | 10 | 9 | 10 | 10 | 10 |

TABLE 6-continued

| adhesive | initial, 20 min. | 1 wk RT | 2 wk RT | 1 wk 60° C. | 2 wk 60° C. |
|---|---|---|---|---|---|
| Example 2 | 9 | 10 | 10 | 9 | 10 |
| Control 4 | 6 | 10 | 10 | 10 | 10 |
| Substrate: brown mailing envelope | | | | | |
| Control 1 | 9 | 9 | 10 | 10 | 10 |
| Example 1 | 9 | 10 | 9 | 10 | 10 |
| Example 3 | 7 | 9 | 9 | 8 | 9 |
| Control 2 | 9 | 9 | 9 | 10 | 10 |
| Example 2 | 8 | 9 | 9 | 9 | 9 |
| Control 4 | 8 | 9 | 10 | 10 | 10 |
| Substrate: white Tyvek | | | | | |
| Control 1 | 7 | 10 | 10 | 10 | 10 |
| Example 1 | 10 | 10 | 9 | 9 | 10 |
| Example 3 | 1 | 7 | 8 | 10 | 10 |
| Control 2 | 4 | 10 | 10 | 9 | 9 |
| Example 2 | 10 | 10 | 10 | 10 | 10 |
| Control 4 | 7 | 10 | 10 | 10 | 10 |
| Substrate: corrugated | | | | | |
| Control 1 | 9 | 10 | 10 | 10 | 10 |
| Example 1 | 9 | 9 | 10 | 9 | 10 |
| Example 3 | 8 | 8 | 6 | 6 | 6 |
| Control 2 | 8 | 9 | 10 | 10 | 10 |
| Example 2 | 8 | 10 | 10 | 10 | 10 |
| Control 4 | 1 | 1 | 1 | 10 | 7 |
| Substrate: Manila file folder | | | | | |
| Control 1 | 10 | 10 | 9 | 9 | 9 |
| Example 1 | 9 | 9 | 10 | 10 | 9 |
| Example 3 | 1 | 9 | 9 | 9 | 9 |
| Control 2 | 10 | 10 | 9 | 9 | 9 |
| Example 2 | 9 | 10 | 9 | 10 | 10 |
| Control 4 | 8 | 10 | 10 | 10 | 10 |
| Substrate: TDK diskette | | | | | |
| Control 1 | 10 | 10 | 10 | 4 | 4 |
| Example 1 | 10 | 10 | 10 | 1 | 1 |
| Example 3 | 10 | 10 | 7 | 1 | 1 |
| Control 2 | 10 | 10 | 10 | 10 | 10 |
| Example 2 | 10 | 10 | 10 | 4 | 4 |
| Control 4 | 10 | 4 | 1 | 1 | 1 |
| Substrate: Sony diskette | | | | | |
| Control 1 | 10 | 10 | 10 | 9 | 9 |
| Example 1 | 10 | 10 | 10 | 7 | 7 |
| Example 3 | 10 | 10 | 10 | 6 | 4 |
| Control 2 | 10 | 10 | 10 | 10 | 10 |
| Example 2 | 10 | 10 | 10 | 8 | 6 |
| Control 4 | 10 | 10 | 10 | 10 | 10 |
| Substrate: Verbatim diskette | | | | | |
| Control 1 | 10 | 10 | 10 | 1 | 1 |
| Example 1 | 10 | 10 | 10 | 1 | 1 |
| Example 3 | 10 | 10 | 10 | 1 | 1 |
| Control 2 | 10 | 10 | 10 | 1 | 1 |
| Example 2 | 10 | 10 | 10 | 1 | 1 |
| Control 4 | 10 | 9 | 9 | 1 | 1 |

Adhesive Performance

Adhesion tests were conducted on the inventive and comparative adhesives using the following tests. The results of the tests are reported in Tables 7, 8 and 9.

Peel Adhesion

The adhesive was coated at a coat weight of 18 g/m² onto a silicone coated release liner and then laminated to a 50 lb. paper facestock, forming a laminate construction. The resulting construction was die-cut into 25×204 mm (1×8 in) strips. The strips were applied centered along the lengthwise direction to stainless steel test panels and rolled down using a 2 kg (4.5 lb.), rubber coated steel roller, rolling back and forth once, at a rate of 30 cm/min (12 in/min). After being conditioned for 24 hours in a controlled environment testing room maintained at 21° C. (70° F.) and 50% relative humidity, the test strips were peeled away from the test panel in an Instron Universal Tester at a peel angle of 90°, i.e., folded back on itself and parallel to the surface of the panel at a rate of 30 cm/min (12 in/min). The force to remove the adhesive test strip from the test panel was measured in lbs./in. All tests were conducted in triplicate.

Polyethylene and corrugated cardboard panels were also used at dwell times of 10 min. and 24 hr. and peeled at 180° or 90°, as indicated. Elevated temperature aging of the adhesive laminate were conducted by conditioning the samples in a 70° C. oven for one week.

Room Temperature Shear (RTS)

The samples were cut into 12×51 mm (½×2 in) test strips and applied to a stainless steel panel resulting in an overlap area of 1.27×1.27 cm (½×½ in). The sample portion on the test panel was rolled down using a 2 kg (4.5 lb.) rubber coated steel roller, rolling back and forth once, at a rate of 30 cm/min (12 in/min). After a dwell time of 20 minutes under standard laboratory testing conditions, the test panels with the test strips on them were then placed at an angle of 2° from the vertical, and a load of 500 g was attached to the test strips free end. The time in minutes for the sample to fail cohesively was measured by a timer. All tests were conducted in triplicate.

Loop Tack

Loop tack measurements were made for 25 mm (1 in) wide strips using stainless steel, polyethylene or corrugated cardboard as the substrate at a removal rate of 30cm/min (12 in/min), according to standard test 1994 TLMI Test L-IB2, TLMI Loop Tack Test, by the Tag and Label Manufacturers Institute Inc. (TLMI), using an Instron Universal Tester Model 4501 from Instron (Canton, Mass.). Loop tack values were taken to be the highest measured adhesion value observed during the test.

| PT | Paper Tear | OZ | Occasionally Zippy |
| P | Panel Failure | LFP | Light Fiber Pick |
| Z | Zippy | SFP | Slight Fiber Pick |

TABLE 7

| Stainless Steel Adhesion | 90° Peel | Aged 90° Peel | | |
|---|---|---|---|---|
| Sample | Looptack | (10 min.) | (10 min.) | RTS |
| Ex. 1 | 2.67 PT | 2.03 PT | 1.65 P/PT | 1765 min. |
| Ex. 2 | 3.08 PT | 1.75 PT | 2.13 PT | 87 min. |
| Ex. 3 | 2.72 PT | 1.59 PT | 1.32 P | 295 min. |
| Con. 1 | 3.24 PT | 1.90 PT | 1.49 P/PT | 84 min. |
| Con. 3 | 3.51 P/PT | 2.37 PT | 1.48 P | 16 min. |
| Con. 4 | 2.7 P | 1.99 PT | 1.52 P/PT | 25 min. |

TABLE 8

| Polyethylene Adhesion | | 180° Peel | 180° Peel | 90° Peel | 90° Peel | Aged 90° Peel |
|---|---|---|---|---|---|---|
| Sample | Looptack | (10 min.) | (24 hrs.) | (10 min.) | (24 hrs.) | (10 min.) |
| Ex. 1 | 1.49 P | 3.32 PT | 3.44 PT | 1.53 PT | 1.47 PT | 0.61 Z |
| Ex. 2 | 1.56 P | 3.35 PT | 3.25 P/PT | 1.26 P/PT | 1.73 PT | 1.11 P |
| Ex. 3 | 0.48 P | 3.41 P | 3.61 P | 0.66 Z | 0.59 Z | 0.70 P |
| Con. 1 | 1.58 P | 3.85 P/PT | 3.56 PT | 1.20 P/PT | 1.37 PT | 1.11 P |
| Con. 3 | 2.20 P | 3.90 PT | 3.81 PT | 1.64 P/PT | 2.18 PT | 1.32 P |
| Con. 4 | 1.02 P | 3.26 P/OZ | 1.61 OZ | 0.50 Z | 0.38 Z | 0.45 Z |

TABLE 9

| Corrugated Adhesion | | 180° Peel | 180° Peel | 90° Peel | 90° Peel | Aged 90° Peel |
|---|---|---|---|---|---|---|
| Sample | Looptack | (10 min.) | (24 hrs.) | (10 min.) | (24 hrs.) | (10 min.) |
| Ex. 1 | 0.92 LFP | 2.74 PT | 2.62 PT | 1.26 LFP/PT | 1.17 PT | 0.60 LFP |
| Ex. 2 | 1.05 P | 3.08 PT | 3.49 PT | 1.05 LFP/PT | 1.10 FP/PT | 0.83 LFP |
| Ex. 3 | 0.32 P | 1.84 LFP/PT | 1.97 PT | 0.58 SFP/PT | 0.82 PT | 0.31 LFP |
| Con. 1 | 1.32 LFP | 2.83 PT | 2.93 PT | 0.87 LFP/PT | 1.19 PT | 0.68 LFP |
| Con. 3 | 1.33 LFP | 3.15 LFP/PT | 2.54 PT | 0.80 LFP | 0.84 P/LFP | 0.43 LFP |
| Con. 4 | 1.10 P | 3.09 PT | 2.94 PT | 0.77 LFP/PT | 1.31 PT | 0.57 LFP |

The data presented in Tables 2 to 9 demonstrate that the new PSAs and constructions exhibit significant improvement in slittability (decreased adhesive build-up on the blades and anvils) and printer performance (decreased adhesive build-up in the printer), without sacrificing overall adhesive performance. Viewed in conjunction with Table 1, the data confirms the strong correlations between (1) storage modulus and slittability and (2) creep at 90° C. and printer performance, a unique and unexpected result. For example, Control 4 has a high storage modulus and therefore causes low adhesive build up during slitting; however, because of its high creep it does not have good printer performance. Similarly, when an adhesive has a low creep value but has a low storage modulus, it will not exhibit good printer performance.

Throughout the text and the claims, use of the word "about" in relation to a range of numbers is intended to modify both the low and the high values stated.

What is claimed is:

1. A pressure-sensitive adhesive (PSA) construction comprising:
a face stock, and
a PSA laminated on the face stock, the PSA having a storage modulus ranging from about $5 \times 10^6$ dyne/cm$^2$ to about $20 \times 10^6$ dyne/cm$^2$ at 1000 radians/s and 25° C. and a creep (% strain) at 90° C. of less than about 125;
wherein the construction, when comprising 50 lb paper face stock, results in a paper tear during a 90° Peel test at room temperature on stainless steel after 10 minutes with a force of at least about 1.0 lbs./in.

2. A PSA construction according to claim 1, wherein the PSA has a storage modulus ranging from about $6 \times 10^6$ dyne/cm$^2$ to about $20 \times 10^6$ dyne/cm$^2$ at 1000 radians/s and 25° C.

3. A PSA construction according to claim 1, wherein the PSA has a creep (% strain) at 90° C. of less than about 100.

4. A PSA construction according to claim 1, wherein the PSA has a creep (% strain) at 90° C. of less than about 60.

5. A PSA construction according to claim 1, wherein the PSA has a creep (% strain) at 90° C. of less than about 50.

6. A PSA construction according to claim 1, wherein the PSA has a storage modulus ranging from about $6 \times 10^6$ dyne/cm$^2$ to about $20 \times 10^6$ dyne/cm$^2$ at 1000 radians/s and 25° C. and a creep (% strain) at 90° C. of less then about 60.

7. A PSA construction according to claim 6, wherein the PSA has a creep (% strain) at 90° C. of less than about 50.

8. A method for minimizing adhesive build-up in a printer caused by extended printing of adhesive labels, comprising passing through the printer a PSA label construction according to claim 1.

9. A method according to claim 8, wherein the PSA has a storage modulus ranging from about $6 \times 10^6$ dyne/cm$^2$ to about $20 \times 10^6$ dyne/cm$^2$ at 1000 radians/s and 25° C.

10. A method accoding to claim 8, wherein the PSA has a storage modulus of at 90° C. of less than about 100.

11. A method according to claim 8, wherein the PSA has a creep (% strain) at 90° C. less than about 60.

12. A method according to claim 8, wherein the PSA has a creep (% strain) at 90° C. of less than about 50.

13. A method according to claim 8, wherein the PSA has a $T_g$ of less than about 0° C.

14. A method according to claim 8, wherein the PSA has a $T_g$ of less than about −5° C.

15. A method according to claim 8, wherein the PSA has a storage modulus ranging from about $6 \times 10^6$ dyne/cm$^2$ to about $20 \times 10^6$ dyne/cm$^2$ at 1000 radians/s and 25° C. creep (% strain) at 90° C. of less than about 60.

16. A method according to claim 15, wherein the PSA has a creep (% strain) at 90° C. of less than about 50.

17. A method according to claim 15, wherein the PSA has a $T_g$ of less than about 0° C.

18. A method according to claim 15, wherein the PSA has a $T_g$ of less than about −50° C.

19. A method for minimizing adhesive build-up on a slitting blade during a PSA label-converting operation, comprising:
preparing a label construction according to claim 1 with a release liner in contact with the PSA; and
slitting the label construction with the blade, whereby the blade is in contact with the release liner, the PSA and the face stock.

20. A pressure-sensitive adhesive (PSA; construction comprising:
a PSA having a storage modulus ranging from about $5 \times 10^6$ dyne/cm$^2$ to about $20 \times 10^6$ dyne/cm$^2$ at 1000 radians/s and 25° C., a creep (% strain) at 90° C. of less than about 125, and a $T_g$ than about 0° C.; and
a face stock adhered to the PSA.

21. A PSA construction according to claim 20, wherein the PSA has a storage modulus ranging from about $6 \times 10^6$ dyne/cm$^2$ to about $20 \times 10^6$ dyne/cm$^2$ at 1000 radians/s and 25° C.

22. A PSA construction according to claim 20, wherein the PSA has a creep (% strain) at 90° C. of less than about 100.

23. A PSA construction according to claim 20, wherein the PSA has a creep (% strain) at 90° C. of less than about 60.

24. A PSA construction according to claim 20, wherein the PSA has a creep (% strain) at 90° C. of less than about 50.

25. A PSA construction according to claim 20, wherein the PSA has a $T_g$ of less than about −5° C.

26. A PSA construction according to claim 20, wherein the PSA has a storage modulus ranging from about $6 \times 10^6$ dyne/cm$^2$ to about $20 \times 10^6$ dyne/cm$^2$ at 1000 radians/s and 25° C. a creep (% strain) at 90° C. of less than about 60, and a $T_g$ of less than about −5° C.

27. A PSA construction according to claim 26, wherein the PSA has a creep (% strain) at 90° C. of less than about 50.

* * * * *